(12) United States Patent
Xie

(10) Patent No.: US 9,645,440 B2
(45) Date of Patent: May 9, 2017

(54) TRANSFLECTIVE LIQUID CRYSTAL DISPLAY PANEL AND A LIQUID CRYSTAL DISPLAY DEVICE

(71) Applicant: Shenzhen China Star Optoelectronics Technology Co., Ltd., Shenzhen, Guangdong (CN)

(72) Inventor: Chang Xie, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 294 days.

(21) Appl. No.: 14/422,357

(22) PCT Filed: Jan. 5, 2015

(86) PCT No.: PCT/CN2015/070120
§ 371 (c)(1),
(2) Date: Feb. 19, 2015

(87) PCT Pub. No.: WO2016/090715
PCT Pub. Date: Jun. 16, 2016

(65) Prior Publication Data
US 2016/0342025 A1 Nov. 24, 2016

(30) Foreign Application Priority Data

Dec. 10, 2014 (CN) .......................... 2014 1 0757117

(51) Int. Cl.
*G02F 1/1335* (2006.01)
*G02F 1/1333* (2006.01)
*G02F 1/1343* (2006.01)

(52) U.S. Cl.
CPC ...... *G02F 1/133555* (2013.01); *G02F 1/1333* (2013.01); *G02F 1/1343* (2013.01);
(Continued)

(58) Field of Classification Search
CPC ......... G02F 1/134363; G02F 1/133345; G02F 1/1368; G02F 1/134309; G02F 1/13439; G02F 1/133707; G02F 1/133514; G02F 1/133555; G02F 1/134336; G02F 1/1343; G02F 1/133753; G02F 1/133553; G02F 1/1362; G02F 1/1335; G02F 1/1337;
(Continued)

(56) References Cited

U.S. PATENT DOCUMENTS

2008/0030663 A1* 2/2008 Igeta ................. G02F 1/133555
349/114

* cited by examiner

*Primary Examiner* — Thoi Duong
(74) *Attorney, Agent, or Firm* — Andrew C. Cheng

(57) ABSTRACT

The disclosure is related to a transflective liquid crystal panel comprising a array substrate, a color filter substrate opposite to the array substrate and a liquid crystal layer disposed between the array substrate and the color filter substrate. The array substrate comprises a plurality of pixel regions, each of which comprising a reflective region, a transmissive region and a plurality of pixel electrodes in a bent-stripped form and spaced from each other. The bending angle of the pixel electrode in the transmissive region is , and the bending angle of the pixel electrode in the reflective region is , wherein so that the amount of phase delay in the transmissive region matches with the amount of phase delay in the reflective region. The disclosure is also related to a liquid crystal display device comprising the transflective liquid crystal panel.

20 Claims, 2 Drawing Sheets

(52) U.S. Cl.
CPC .... *G02F 1/13439* (2013.01); *G02F 1/133514* (2013.01); *G02F 1/133528* (2013.01); *G02F 1/134309* (2013.01); *G02F 2001/133531* (2013.01); *G02F 2201/121* (2013.01); *G02F 2201/123* (2013.01); *G02F 2203/01* (2013.01)

(58) Field of Classification Search
CPC ... G02F 1/133528; G02F 2001/134372; G02F 2001/13706; G02F 2001/133757; G02F 2001/133761; G02F 2201/40; G02F 2201/123; G02F 2203/09
USPC ......... 349/138, 141, 96, 106, 139, 113, 114, 349/144, 143, 129
See application file for complete search history.

TRANSFLECTIVE LIQUID CRYSTAL DISPLAY PANEL AND A LIQUID CRYSTAL DISPLAY DEVICE

BACKGROUND

Technical Field

The disclosure is related to liquid crystal display technology field, and more particular to a transflective liquid crystal panel and a liquid crystal display device having the transflective liquid crystal panel.

Related Art

Liquid crystal displays (abbreviated as LCD) with its excellent performance and mature technology currently have become mainstream products on the market. Liquid crystal panels are the key components of liquid crystal displays. Liquid crystal panels are mainly formed by color filter substrates and array substrates through cell assembly. The liquid crystal is filled between the color filter substrate and the array substrate to form a liquid crystal cell. Types of LCD panels can be divided as transmissive type, reflective type and transflective type according to the type of the light source.

The transmissive type LCD panel adopts a backlight as the light source. The backlight is disposed on the rear side of the liquid crystal panel. The pixel electrodes on the array substrate are transparent, and are used as a transmissive region for facilitating the light from the backlight going through the liquid crystal layer to display an image. The reflective type LCD panel adopts a front light source or an external light source as the light source. The array substrate adopts metal or other reflective electrodes using material having good reflective property as a reflective region for reflecting the front light source or the external light. The transflective type LCD panel is a combination of the transmissive type LCD panel and the reflective type LCD panel. The array substrate is provided with a transmissive region and a reflective region. The backlight and the front light source or the external light source are used simultaneously for display.

The transmissive type LCD panel has the advantage of display bright images in the dark environment. However the drawback is the transmissive light is a small portion of the light emitted from the backlight. The usage of the backlight is not high. In order to improve the display luminance it needs to greatly improve the brightness of the backlight, and therefore the energy consumption is high. The advantage of the reflective type LCD panel is that the external light source may be used and the energy consumption is low. However the drawback is that the image cannot be displayed in the dark due to the dependence on the external light source. The transflective type LCD panel has the advantages of the transmissive type LCD panel and the reflective type LCD panel. Not only the bight image may be displayed in the dark for indoor use but also the panel may used outdoors. Therefore, the transflective type LCD panels are widely employed on the display device of the portable mobile electronic products, for example, mobile phones, digital cameras, pocket PCs or GPRS.

However, the drawback of the transflective type LCD panel is that the light from the transmissive region only passes through the liquid crystal layer once, and the light from the reflective region passes through the liquid crystal layer twice. Thus the light from the different light sources in the transflective type LCD device has different optical paths in the transmissive region and the reflective region such that the chromatic aberration is larger between transmissive region and the reflective region. This results in the color incongruity for the image displayed in the transflective type LCD device. In order to improve the color incongruity, currently the transflective type LCD panel usually adopts double cell gap such that the cell thickness of the liquid crystal cell in the corresponding reflective region is half of the cell thickness of the liquid crystal cell in the corresponding transmissive region to ensure the equivalence between the phase delay of the liquid crystal in the reflective region and the phase delay of the liquid crystal in the transmissive region (that is the phase delay of the light passing through these two region may match with each other). Thus the color incongruity between the reflective region and the transmissive region is ensured to be smaller and the color congruity is ensured. However, the cell gap existing among the liquid crystal cells of the transflective liquid crystal panel complicates the manufacture process, and makes it difficult to control the uniformity of the cell gap.

SUMMARY

In order to solve the problem existing in the current technology of the transflective liquid crystal panel, one embodiment of the disclosure provides a transflective liquid crystal panel and a liquid crystal display device comprising the transflective liquid crystal panel. Under the guarantee for the equivalence for the cell gap of the liquid crystal cell in the transmissive region and the reflective region, the manufacturing process of the liquid crystal panel can be simplified. The chromatic aberration between the transmissive region and the reflective region decreases and the color congruity is ensured. The displaying quality of the liquid crystal display device is increased.

To achieve the above object, the disclosure adopts the following technical solutions:

In one embodiment of the disclosure provides an array substrate, a color filter substrate opposite to the array substrate and a liquid crystal layer disposed between the array substrate and the color filter substrate. The array substrate comprises a plurality of pixel regions, each of which comprising a reflective region, a transmissive region and a plurality of pixel electrodes in a bent-stripped form and spaced from each other; wherein the bending angle of the pixel electrode in the transmissive region is $\alpha 1$ and the bending angle of the pixel electrode in the reflective region is $\alpha 2$; wherein $\alpha 1 < \alpha 2$ so that the amount of phase delay in the transmissive region matches with the amount of phase delay in the reflective region.

In one embodiment, a reflective layer is disposed on the array substrate, the reflective region is covered by the reflective layer, and the transmissive region is uncovered by the reflective layer.

In one embodiment, a common electrode layer is disposed on the array substrate; the common electrode covers the reflective layer; an isolation layer is disposed on the common electrode layer; the pixel electrodes are disposed on the isolation layer; the common electrode layer and the plurality of pixel electrodes are electrically insulated through the isolation layer.

In one embodiment, the optical path difference of the transmissive region is two times of the optical path difference of the reflective region.

In one embodiment, the liquid crystal display panel future comprises a first polarizer disposed at one side of the color filter substrate and far from the liquid crystal layer and a second polarizer disposed at one side of the array substrate and far from the liquid crystal layer; wherein the optical transmission axial of the first polarizer is parallel to the optical transmission axial of the second polarizer.

In one embodiment, the initial orientation direction of the liquid crystal molecules in the liquid crystal layer is parallel to the optical transmission axis of the polarizer.

In one embodiment, the liquid crystal layer is made of positive liquid crystal.

In one embodiment, the thickness of the liquid crystal panel corresponding to the transmissive region is equal to the thickness of the liquid crystal panel corresponding to the reflective region.

Another embodiment of the disclosure provides a liquid crystal display device, comprising a liquid crystal panel and a backlight module; the liquid crystal panel is opposite to the backlight module; the backlight module provides light to the liquid crystal display panel; wherein the liquid crystal panel uses the transflective liquid crystal panel stated as above.

The embodiment of the disclosure provides a transflective liquid crystal panel having pixel electrodes in a bent-stripped form with different bending angles in the transmissive region and the reflective region. The bending angle of the pixel electrode in the transmissive region is smaller than the bending angle of the pixel electrode in the reflective region such that the phase delays of the liquid crystal in the transmissive region and the reflective region matches with each other. Therefore the cell gap of the liquid crystal cell does not need change. The consistency of the cell gap of the liquid crystal cell greatly simplifies the manufacture process for the liquid display panel, and improves the display quality of the liquid crystal display device.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which.

DETAILED DESCRIPTION

The following description with reference to the accompanying drawings is provided to explain the transflective liquid crystal panel and the liquid crystal display for those skilled in the art to better understand the exemplary embodiments of the disclosure.

Figure 2:
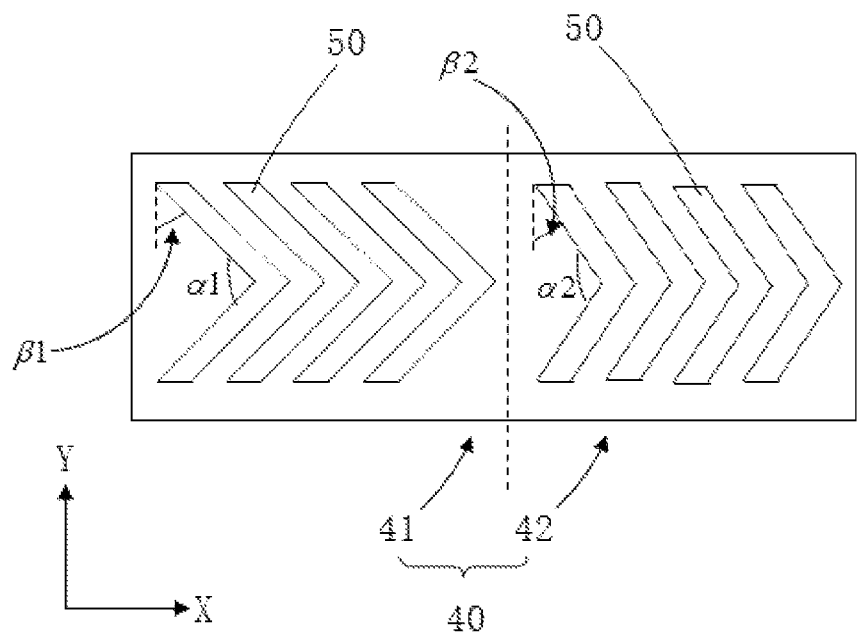
FIG. 2 is a schematic structure of the pixel electrode in a pixel region according to the embodiment of the disclosure.
Figure 3:
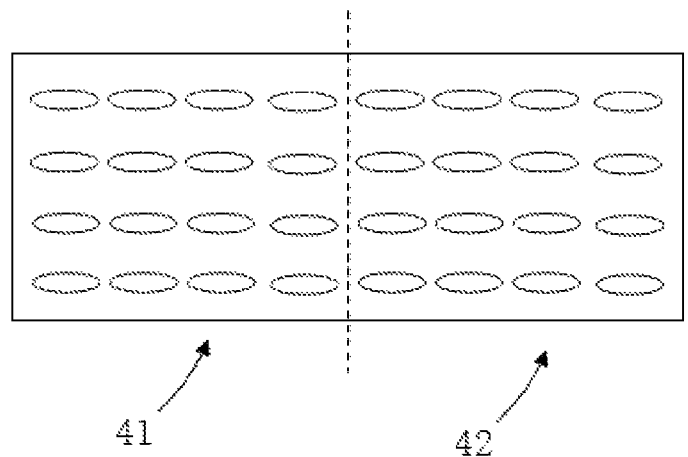
FIG. 3 is a top view of the liquid crystal layer not applied with a voltage according to the embodiment of the disclosure.

Refer to FIG. 2 and FIG. 3. The transflective liquid crystal panel of the embodiment comprises an array substrate 10, a color filter substrate 20 and a liquid crystal layer 30 disposed between the array substrate 10 and the color filter substrate 20. The array substrate 10 comprises a plurality of pixel regions 40. Each of the pixel region 40 comprises a transmissive region 41 and a reflective region 42. The array substrate 10 further comprises a plurality of pixel electrodes 50 disposed in the pixel region 40. Each of the pixel electrode 50 is in a bent-stripped form and spaced from each other. Furthermore, the bending angle of the pixel electrode in the transmissive region 41 is α1, and the bending angle of the pixel electrode in the reflecting region 42 is α2, wherein α1<α2 so that the amount of phase delay in the transmissive region 41 matches with the amount of phase delay in the reflective region 42.

Figure 1:
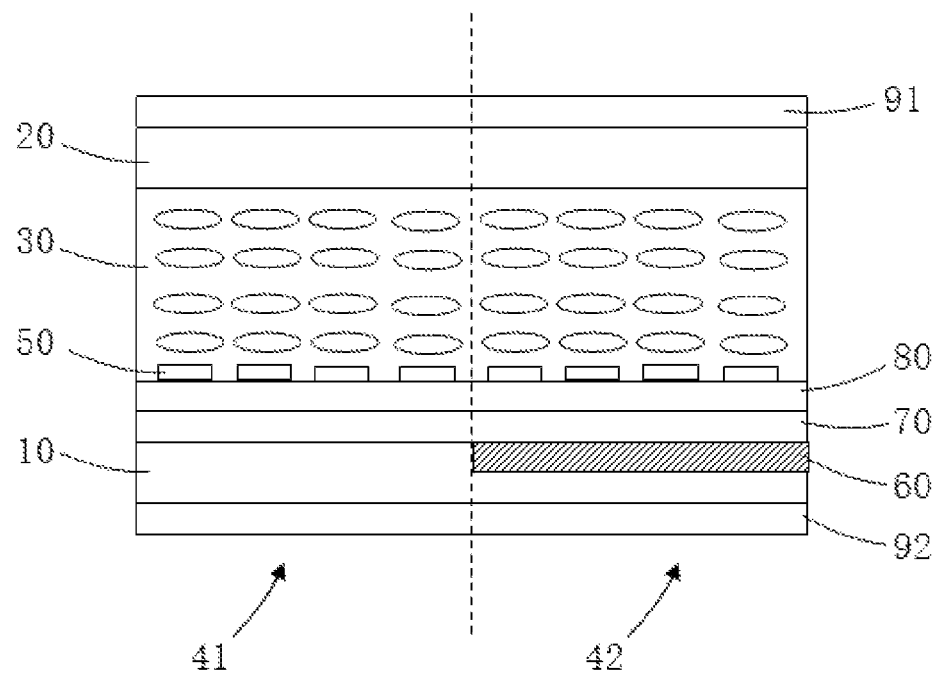
FIG. 1 is a schematic structure of the transflective liquid crystal panel according to the embodiment of the disclosure.

Specifically, as illustrated in FIG. 1, the array substrate 10 is proved with a reflective layer 60. A region covered by the reflective layer 60 is the reflective layer 42. A region not covered by the reflective layer 60 is the transmissive region 41. Furthermore, a common electrode layer 70 is disposed on the array substrate 10. The common electrode layer 70 covers the reflective layer 60. An isolation layer 80 is disposed on the common electrode layer 70. The pixel electrodes 50 are disposed on the isolation layer 80. The common electrode layer 70 and the plurality of pixel electrodes 50 are electrically insulated through the isolation layer 80. Furthermore, the liquid crystal display panel future comprises a first polarizer 91 and a second polarizer 92. The first polarizer 91 is disposed at one side of the color filter substrate and far from the liquid crystal layer. The second polarizer 92 is disposed at one side of the array substrate and far from the liquid crystal layer. The optical transmission axial of the first polarizer 91 is parallel to the optical transmission axial of the second polarizer 92 (the X direction in FIG. 2).

In the embodiment, the liquid crystal layer 30 is made of positive liquid crystal. FIG. 3 is a top view of the liquid crystal layer not applied with a voltage according to the embodiment of the disclosure. As shown in FIG. 3, in the embodiment, the initial orientation direction of the liquid crystal molecules in the liquid crystal layer 30 is parallel to the optical transmission axis of the polarizer 91 and 92.

In order to ensure match of the phase delay between the transmissive region and the reflective region in the liquid crystal display panel, it requires to dispose the pixel electrodes in a bent-stripped form having different bending angles in the transmissive region and the reflective region. As shown in FIG. 2, the bending angle of the pixel electrode 50 in the transmissive region 41 is α1, and the bending angle of the pixel electrode 50 in the reflective region 42 is α2, wherein α1<α2. Or the tilt angle of the pixel electrode in the transmissive region is greater than the tilt angle of the pixel electrode in the reflective region. Herein, the tilt angle of the pixel electrode indicates the angle of the pixel electrode perpendicular to the transmission axis (as the Y direction in FIG. 2) of the polarizer 91 and 92. As shown in FIG. 2, the bending angle of the pixel electrode 50 in the transmissive region 41 is β1, and the bending angle of the pixel electrode 50 in the reflective region 42 is β2, wherein β1>β2.

Figure 4:
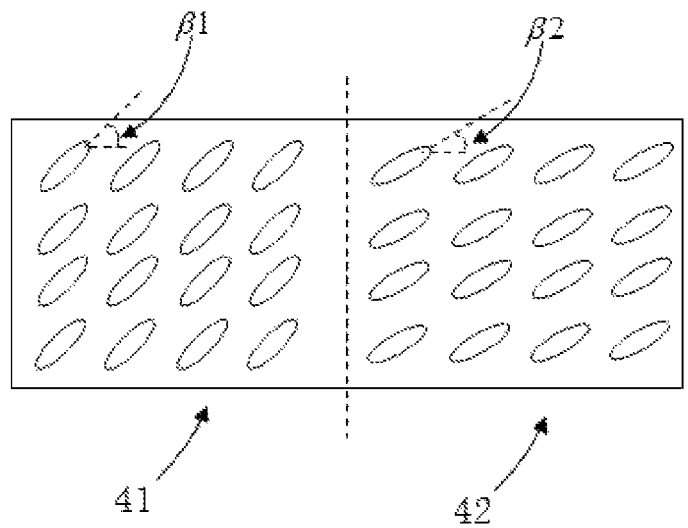
FIG. 4 is a top view of the liquid crystal layer applied with a voltage according to the embodiment of the disclosure.

FIG. 4 is a top view of the liquid crystal layer applied with a voltage according to the embodiment of the disclosure. When the pixel electrode 50 is applied with a voltage, in the transmissive region 41, as the tilt angle of the pixel electrode 50 is grater, an electric field having greater tilt angle may be generated. Under the action of the electric field, the liquid crystal molecules have a greater deflection angle. The light passing through the transmissive region 41 has greater phase delay. In the reflective region 42, as the tilt angle of the pixel electrode 50 is smaller, an electric field having smaller tilt angle may be generated. Under the action of the electric field, the liquid crystal molecules have a smaller deflection angle. The light passing through the reflective region 42 has greater phase delay. Therefore, optimization on the tilt angle of the pixel electrode 50 results in that the light passing through the transmissive region 41 generates a greater optical path difference than the light passing through the reflective region 42. The optical path difference of the transmissive region 41 is two times of the optical path difference of the reflective region 42. Due to the reflection of the light in the reflective region 42, the light passes through the liquid crystal layer 30 two times. Therefore, match between the phase delay of the transmissive region and the phase delay of the reflective region is achieved, and the transflective display effect is also finally achieved.

In the actual manufacture process, experiment test method may be adopted to find the optimized angle for the tilt angle of the pixel electrode 50 of the transmissive region 41 and the reflective region 42. The determination for the tilt angles of both is relevant with the property of the liquid crystal (such as birefringence property, the dielectric anisotropy property, or the dielectric constant). Specifically, the tilt angles of both for a particular liquid crystal panel may be determined according to the following experiment test method.

First, various test panels are produced according to various pre-determined tilt angles, and these test panels are filled with a particular liquid crystal as stated above. Secondly, the voltage-transmittance characteristic curves of the transmissive region and the reflective region for these various test panels are depicted. If the characteristic curves of the transmissive region and the reflective region for a test panel are consistent within the error range, then the phase delay of the transmissive region is substantively two times of the phase delay of the reflective region. Then the tilt angle of the pixel electrode of the transmissive region and the reflective region for the test panel may be used a reference value for manufacture. The embodiment of the disclosure does not limit the above ratio. The value that may make the phase delay generated by the light of the transmissive region and the reflective region in the same pixel region the same after the light passes through the liquid crystal layer is adopted during actual manufacture process.

In the embodiment, the thickness of the liquid crystal layer 30 corresponding to the reflective region 42 is equivalent to the thickness of the liquid crystal layer 30 corresponding to the transmissive region 41. That is the liquid crystal panel is a single cell gap transflective liquid crystal panel. Because the cell gap of the liquid crystal cell in the liquid crystal panel is uniform, the consistency of the cell gap of the liquid crystal cell greatly simplifies the manufacture process for the liquid display panel, and improves the display quality of the transflective liquid crystal display device.

Figure 5:
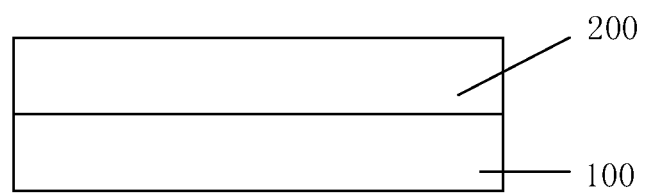
FIG. 5 is a schematic structure of the liquid crystal display device according to the embodiment of the disclosure.

The embodiment further provides a liquid crystal display device. As shown in FIG. 5, the liquid crystal display device provided in the embodiment comprises a liquid crystal panel 200 and a backlight module 100 arranged oppositely. The backlight module 100 provides light for the liquid crystal panel 200, wherein the liquid crystal panel 200 adopts the transflective liquid crystal panel as stated above.

It is noted that in the context the relationship terms such as first and second or the like are only used to distinguish one entity or operation from another entity or operation separate. It does not necessarily require or imply that such actual relationship or sequence exists between these entities or operation. Moreover, the term "comprising", "including" or any other variation thereof, is intended to cover a non-exclusive inclusion such that a process, a method, an article, or an apparatus comprising a series of elements comprise not only those elements, but also other elements that are not expressly listed. In case there are no more limitation, the element defined by the statement "comprises a . . . " does not exclude the existence of additional identical elements in the process, method, article, or apparatus comprising the element.

Although the present disclosure is illustrated and described with reference to specific embodiments, those skilled in the art will understand that many variations and modifications are readily attainable without departing from the spirit and scope thereof as defined by the appended claims and their legal equivalents. Those variations and modifications should also be regarded as the protection scope of the present disclosure.

What is claimed is:

1. A transflective liquid crystal panel, comprising:
   an array substrate, comprising:
      a plurality of pixel regions, each pixel region comprising:
         a reflective region;
         a transmissive region; and
         a plurality of pixel electrodes in a bent-stripped form and spaced from each other;
      a color filter substrate opposite to the array substrate; and
      a liquid crystal layer disposed between the array substrate and the color filter substrate;
   wherein the bending angle of the pixel electrode in the transmissive region is $\alpha 1$, and the bending angle of the pixel electrode in the reflective region is $\alpha 2$; wherein $\alpha 1 < \alpha 2$ so that the amount of phase delay in the transmissive region matches with the amount of phase delay in the reflective region.

2. The transflective liquid crystal panel of claim 1, wherein a reflective layer is disposed on the array substrate; the reflective region is covered by the reflective layer; the transmissive region is uncovered by the reflective layer.

3. The transflective liquid crystal panel of claim 2, wherein a common electrode layer is disposed on the array substrate; the common electrode layer covers the reflective layer; an isolation layer is disposed on the common electrode layer; the pixel electrodes are disposed on the isolation layer; the common electrode layer and the plurality of pixel electrodes are electrically insulated through the isolation layer.

4. The transflective liquid crystal panel of claim 3, wherein the optical path difference of the transmissive region is two times of the optical path difference of the reflective region.

5. The transflective liquid crystal panel of claim 2, wherein the liquid crystal display panel further comprises:
   a first polarizer disposed at one side of the color filter substrate and far from the liquid crystal layer; and
   a second polarizer disposed at one side of the array substrate and far from the liquid crystal layer;
   wherein the optical transmission axis of the first polarizer is parallel to the optical transmission axis of the second polarizer.

6. The transflective liquid crystal panel of claim 1, wherein the liquid crystal display panel further comprises:
   a first polarizer disposed at one side of the color filter substrate and far from the liquid crystal layer; and
   a second polarizer disposed at one side of the array substrate and far from the liquid crystal layer;
   wherein the optical transmission axis of the first polarizer is parallel to the optical transmission axis of the second polarizer.

7. The transflective liquid crystal panel of claim 6, wherein the initial orientation direction of the liquid crystal molecules in the liquid crystal layer is parallel to the optical transmission axis of the polarizer.

8. The transflective liquid crystal panel of claim 5, wherein the liquid crystal layer is made of positive liquid crystal.

9. The transflective liquid crystal panel of claim 6, wherein the thickness of the liquid crystal panel corresponding to the transmissive region is equal to the thickness of the liquid crystal panel corresponding to the reflective region.

10. The transflective liquid crystal panel of claim 1, wherein the thickness of the liquid crystal panel corresponding to the transmissive region is equal to the thickness of the liquid crystal panel corresponding to the reflective region.

11. A liquid crystal display device, comprising a liquid crystal panel and a backlight module, the liquid crystal panel opposite to the backlight module, the backlight module providing light to the liquid crystal display panel, wherein the liquid crystal panel is a transflective liquid crystal panel, the liquid crystal display device comprising:
an array substrate, comprising:
a plurality of pixel regions, each pixel region comprising:
a reflective region;
a transmissive region; and
a plurality of pixel electrodes in a bent-stripped form and spaced from each other;
a color filter substrate opposite to the array substrate; and
a liquid crystal layer disposed between the array substrate and the color filter substrate;
wherein the bending angle of the pixel electrode in the transmissive region is $\alpha 1$, and the bending angle of the pixel electrode in the reflective region is $\alpha 2$; wherein $\alpha 1 < \alpha 2$ so that the amount of phase delay in the transmissive region matches with the amount of phase delay in the reflective region.

12. The liquid crystal display device of claim 11, wherein a reflective layer is disposed on the array substrate; the reflective region is covered by the reflective layer; the transmissive region is uncovered by the reflective layer.

13. The liquid crystal display device of claim 12, wherein a common electrode layer is disposed on the array substrate; the common electrode covers the reflective layer; an isolation layer is disposed on the common electrode layer; the pixel electrodes are disposed on the isolation layer; the common electrode layer and the plurality of pixel electrodes are electrically insulated through the isolation layer.

14. The liquid crystal display device of claim 13, wherein the optical path difference of the transmissive region is two times of the optical path difference of the reflective region.

15. The liquid crystal display device of claim 12, wherein the liquid crystal display panel further comprises:
a first polarizer disposed at one side of the color filter substrate and far from the liquid crystal layer; and
a second polarizer disposed at one side of the array substrate and far from the liquid crystal layer;
wherein the optical transmission axis of the first polarizer is parallel to the optical transmission axis of the second polarizer.

16. The liquid crystal display device of claim 11, wherein the liquid crystal display panel further comprises:
a first polarizer disposed at one side of the color filter substrate and far from the liquid crystal layer; and
a second polarizer disposed at one side of the array substrate and far from the liquid crystal layer;
wherein the optical transmission axis of the first polarizer is parallel to the optical transmission axis of the second polarizer.

17. The liquid crystal display device of claim 16, wherein the initial orientation direction of the liquid crystal molecules in the liquid crystal layer is parallel to the optical transmission axis of the polarizer.

18. The liquid crystal display device of claim 16, wherein the liquid crystal layer is made of positive liquid crystal.

19. The liquid crystal display device of claim 16, wherein the thickness of the liquid crystal panel corresponding to the transmissive region is equal to the thickness of the liquid crystal panel corresponding to the reflective region.

20. The liquid crystal display device of claim 11, wherein the thickness of the liquid crystal panel corresponding to the transmissive region is equal to the thickness of the liquid crystal panel corresponding to the reflective region.

* * * * *